F. N. THIMBLE.
FILM BOX.
APPLICATION FILED JUNE 25, 1917.
1,277,665.
Patented Sept. 3, 1918.
2 SHEETS—SHEET 1.
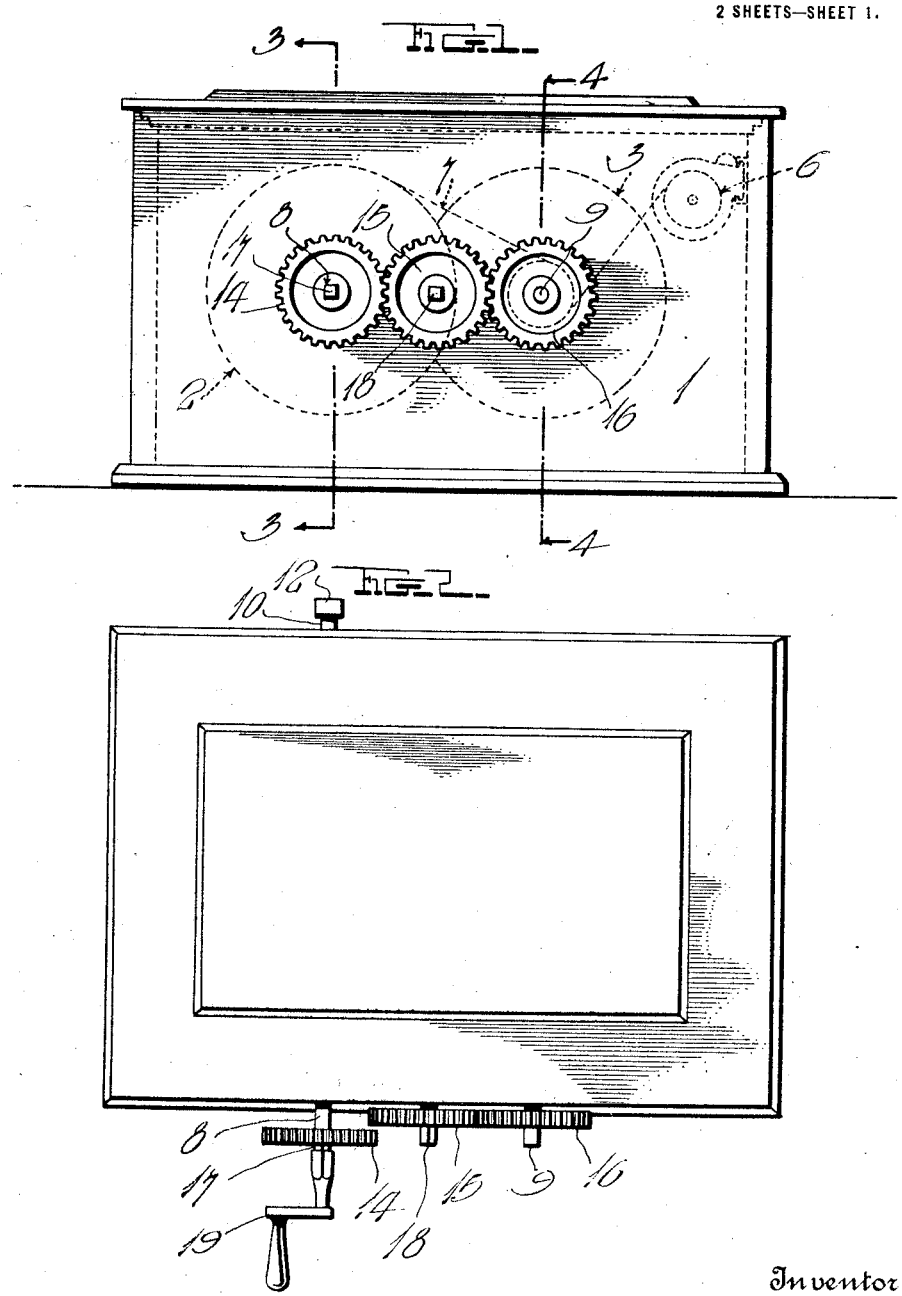

F. N. THIMBLE.
FILM BOX.
APPLICATION FILED JUNE 25, 1917.
1,277,665.
Patented Sept. 3, 1918.
2 SHEETS—SHEET 2.
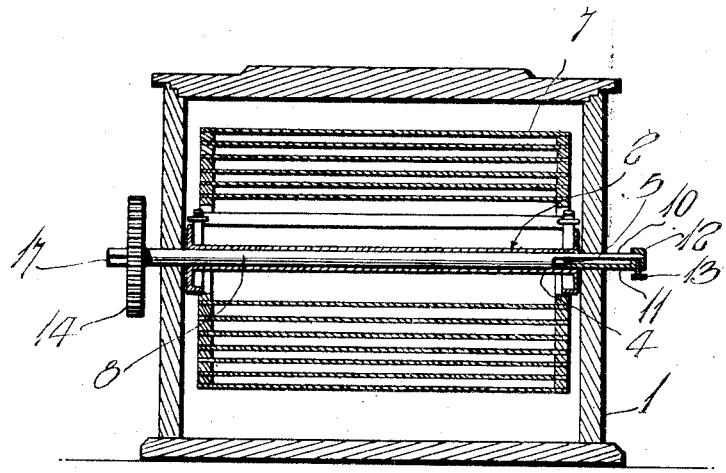
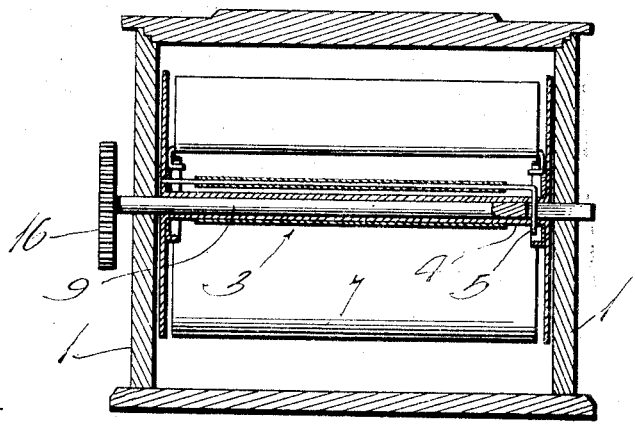
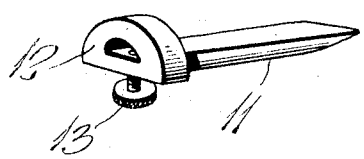
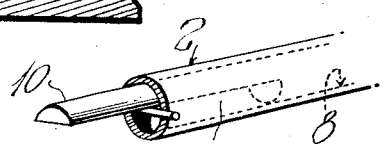
Witness
H. Woodard
Inventor
F. N. Thimble
By H. B. Willson & Co.
Attorneys

UNITED STATES PATENT OFFICE.

FREDERICK N. THIMBLE, OF LONG ISLAND CITY, NEW YORK.

FILM-BOX.

1,277,665.　　　　Specification of Letters Patent.　　Patented Sept. 3, 1918.

Application filed June 25, 1917. Serial No. 176,825.

*To all whom it may concern:*

Be it known that I, FREDERICK N. THIMBLE, a citizen of the United States, residing at Long Island city, in the county of Queens and State of New York, have invented certain new and useful Improvements in Film-Boxes; and I do declare the following to be a full, clear, and exact description of the invention, such as will enable others skilled in the art to which it appertains to make and use the same.

My invention relates to the so-called film boxes for winding photographic films between the convolutions of a flexible apron, preparatory to inserting the whole into a developing tank. Film boxes of this class, employ a pair of spools, from one of which onto the other the usual flexible apron is wound, the film being fed between the several convolutions of said apron during the winding operation. The general method is to rotate one spool and to exert a suitable braking action on the other, by means of the crank provided. This method, however, is not altogether effective, and the object of my invention, therefore, is to provide a novel means for insuring proper relative rotation of the two spools.

A further object is to carry out the above end without the necessity of making a multiplicity of alterations in the usual film box, the usual pair of sliding shafts still being employed.

A further object is to so construct the device as to permit both shafts to be turned simultaneously, or separately, as occasion may demand.

With the foregoing general objects in view the invention resides in the novel features of construction and the unique combinations of parts to be hereinafter fully described and claimed, the descriptive matter being supplemented by the accompanying drawings which form a part of this specification and in which;

Figure 1 is a front elevation of a film box constructed in accordance with the invention;

Fig. 2 is a top plan view showing one of the gears shifted out of mesh with the central gear;

Fig. 3 is a vertical transverse section on the plane of the line 3—3 of Fig. 1, showing more particularly the means for limiting the sliding movement of one of the aforesaid shafts;

Fig. 4 is a view similar to Fig. 3 on the plane of the line 4—4 of Fig. 1;

Fig. 5 is a perspective view of the rear end of one of the shafts and Fig. 6 is a similar view of the collar which is mounted on said end.

In the drawings above briefly described, the numeral 1 has reference to the usual film box, such box having therein a pair of parallel apron winding spools 2 and 3, each spool being provided with a tubular body portion 4 across which a pin 5 extends. Also mounted in the box 1 is the usual cartridge holder or support 6 which carries the film cartridge from which the film is unwound and fed between the layers or convolutions of the apron 7, the latter being wound from the spool 2 onto spool 3 by proper rotation thereof.

A pair of shafts 8 and 9 extend through the front and rear sides of the box 1 and are received slidably in the body portion 4 of the spools 2 and 3 respectively, the rear ends of said shafts being bifurcated to straddle the pins 5 so that rotation of said shafts will correspondingly move the spools 2 and 3. One furcation 10 of the shaft 8 is formed integrally with said shaft, whereas the other furcation 11, is mounted on a collar 12 which fits over the outer end of the furcation 10, a set screw 13 being provided for clamping said collar in place. This feature of construction, will permit the shaft 8 to slide forwardly until the collar 12 strikes the box 1, so that a spur gear 14, with which the front end of said shaft is provided, may be moved out of mesh with a central gear 15 which is mounted on the box 1 between the two shafts. When the gears are thus moved out of mesh the spool 2 may be turned in the proper direction for winding the apron 7 thereon, preparatory to re-winding said apron on spool 3. Removal of the collar 12 and furcation 11 permits withdrawal of shaft 8 to remove the spool 2.

A third spur gear 16 is carried rigidly on the front end of the shaft 9 and normally meshes with the gear 15. By sliding shaft 9 forwardly, however, these gears may be brought out of mesh as will be readily understood. In most cases, however, it is not necessary to move the gears 15 and 16 out of mesh, as is the case with the gears 15 and 14.

The gears 15 and 14 respectively, are provided with squared central hubs 17 and 18 to either one of which a suitable crank 19 is applicable for turning both shafts or one as occasion may demand.

By constructing the improved film box in the manner shown and described, the apron 7 may be wound from the spool 3 onto the spool 2, preparatory to again winding said apron onto spool 3, whenever a film is to be prepared for developing. This rotation of the spool 2 will be imparted thereto by applying the crank 19 to the hub 17, the gears 14 and 15 being then out of mesh, the shaft 8 having been shifted forwardly to position said gears in this relation. When re-winding the apron 7 onto the spool 3, and at the same time interposing the film between the several convolutions of said apron, it is desirable in the present device that the two spools 2 and 3 rotate at the same speed. This result is accomplished by throwing all three gears into mesh and turning the central gear by means of the crank 19 which is then applied to the central hub 18. By thus winding it is unnecessary for the operator to exert a braking action on the spool 2 in order to insure tight winding, this result being obtained automatically by the fact that the two spools are driven in unison. When first starting to wind the apron onto spool 3, it leaves spool 2 faster than it is wound on spool 3, thus causing considerable slack. As the diameter of the portion of the apron on spool 3 increases however, it gradually winds faster until the slack is taken up and the apron tightly wound on said spool.

From the foregoing, taken in connection with the accompanying drawings, it will be obvious that although my invention is of simple and inexpensive nature, it will be highly efficient for the purposes intended. Since probably the best results are obtained from the specific construction shown and described, such construction constitutes the preferred form of the device. I wish it understood, however, that within the scope of the invention as claimed, numerous minor changes may be made without sacrificing the principal advantages.

I claim:

1. The combination of a film box having a pair of apron spools therein, from one of which an apron is to be wound onto the other, a pair of shafts passing through the sides of the box and through said spools, said shafts being slidable endwise in said spools, a central gear mounted on the exterior of the box between said shafts, other gears of uniform size mounted fixedly on said shafts for mesh with said central gear, but movable out of mesh therewith when either shaft is shifted endwise, and means for turning the three gears in unison.

2. The combination of a film box having a pair of apron spools therein, provided with tubular body portions and pins extending across said portions, a pair of shafts passing through the sides of the box and bifurcated at their rear ends to straddle said pin, one furcation on one shaft being separate from said shaft, a collar carrying said furcation and secured on said shaft, a central gear mounted on the exterior of the box between the front ends of the shafts, other gears secured on said shafts for mesh with said central gear but shiftable out of mesh therewith by endwise sliding of the shafts, and means for turning the three gears in unison.

3. The combination of a film box having a pair of apron spools therein from one of which an apron is to be wound onto the other, and means for rotating said spools simultaneously at the same speed.

In testimony whereof I have hereunto set my hand in the presence of two subscribing witnesses.

FREDERICK N. THIMBLE.

Witnesses:
 HYNEK NAPRSTEK,
 G. STREMET.